US005552959A

United States Patent [19]
Penniman et al.

[11] Patent Number: 5,552,959
[45] Date of Patent: Sep. 3, 1996

[54] NOTEBOOK COMPUTER DOCKING STATION HAVING FLOATING CONNECTOR INTERFACE STRUCTURE

[75] Inventors: Mark Penniman, Austin; Carmen Schlesener, Pflugerville; Bill Inkman, Colleyville, all of Tex.

[73] Assignee: Dell USA, L.P., Austin, Tex.

[21] Appl. No.: 219,607

[22] Filed: Mar. 29, 1994

Related U.S. Application Data

[63] Continuation-in-part of Ser. No. 858, Jan. 5, 1993, Pat. No. 5,313,596.
[51] Int. Cl.$^6$ ............................ G06F 1/16; H01R 13/62; H05K 7/10
[52] U.S. Cl. ........................ 361/686; 439/248; 361/727
[58] Field of Search ............................ 439/246–248; 364/708.1; 361/686

[56] References Cited

U.S. PATENT DOCUMENTS

| | | | |
|---|---|---|---|
| 3,951,500 | 4/1976 | Anderson | 439/248 |
| 5,313,596 | 5/1994 | Swindler et al. | 364/708.1 X |
| 5,323,291 | 6/1994 | Boyle et al. | 361/686 X |

FOREIGN PATENT DOCUMENTS 0530453  3/1993  European Pat. Off. .......... G06F 1/16

*Primary Examiner*—Michael W. Phillips
*Attorney, Agent, or Firm*—Henry N. Garrana; Mark P. Kahler; Michelle M. Turner

[57] ABSTRACT

A docking station structure is used to operatively connect a notebook computer to desktop computer peripheral devices. In response to manual insertion of the computer into the interior of the docking station a motorized travel structure drives the computer further into the docking station and forcibly interconnects pin type connectors carried by the computer and the docking station. The docking station connector is supported for translational movement by a specially designed floating connector interface structure which permits the docking station connector to translationally shift, in response to forcible engagement by the computer connector portion when there is a misalignment between the computer and docking station connectors, in order to precisely align the two connectors before they are telescopingly mated with one another. The connector interface structure is spring biased toward a ready-for-docking position thereof, and incorporates therein an anti-rotation structure that prevents the docking structure connector from being rotated into an undesirable pivotally buckled relationship with the incoming computer connector portion.

25 Claims, 9 Drawing Sheets

NOTEBOOK COMPUTER DOCKING STATION HAVING FLOATING CONNECTOR INTERFACE STRUCTURE

CROSS-REFERENCE TO RELATED APPLICATION

This application is a continuation-in-part of copending U.S. application Ser. No. 08/000,858 filed on Jan. 5, 1993 and entitled "MOTORIZED PORTABLE COMPUTER/EXPANSION CHASSIS DOCKING SYSTEM", now U.S. Pat. No. 5,313,596, the disclosure of which is hereby incorporated herein by reference.

BACKGROUND OF THE INVENTION

The present invention generally relates to computer apparatus and, in a preferred embodiment thereof, more particularly relates to a floating connector interface structure incorporated in a motorized docking structure used to releasably receive a notebook computer and operably connect it to desktop computer peripheral equipment such as a monitor, keyboard and mouse.

Various portable computer docking systems have recently been proposed for providing a portable computer user with the benefits of a portable computer together with the benefits of a conventional desktop computer system. Under this interesting combination computer use scheme a docking station is provided into which the portable computer, typically a notebook computer, may be inserted, with the docking station serving as an operative interface between the inserted notebook computer and desktop peripheral equipment such as a keyboard, monitor and mouse.

To effect the operative electrical coupling between the inserted computer and the desktop peripheral devices, a pin type connector is positioned within the interior of the docking station and coupled to a motherboard therein which, in turn, is connected to the peripheral devices. As the computer is inserted into the interior of the docking station a guide structure therein engages the computer to align a pin type connector carried thereby with the docking station connector so that when the computer is moved to the docking station connector (either manually or by a motorized drive system within the docking station) the two pin type connectors telescopingly mate to thereby "dock" the computer and operatively couple it with the desktop peripheral devices.

While this connector-mating docking engagement of the inserted computer is simple to describe, in actual practice it is not nearly so easy to achieve. This is due to the very precise alignment required between the docking station and computer pin connectors to cause them to mate properly when the computer is forcibly inserted into the docking station. Even a very small misalignment between the two connectors can prevent their operative coupling within the docking station. Such a small misalignment may easily be present due to the fact that many constructional tolerances potentially "stack up" in the fabrication of the docking station and the portable computer in a manner adversely affecting the connector-to-connector alignment accuracy.

For example, an unacceptable amount of connector misalignment may cumulatively be created by misalignments between the docking station connector and the docking station motherboard to which the connector is secured; the docking station connector pins relative to their associated connector housing; the docking station motherboard and the docking station chassis upon which it is mounted; the docking station chassis and its associated computer guiding structure; the exterior dimensions of the computer and the docking station guide structure; the location of the computer connector and the computer housing and its motherboard; and the computer connector pins relative to their associated connector housing, and so on.

One previously proposed solution to this potential connector misalignment problem is to simply reduce all of the tolerances that may cumulate to misalign the connectors in the finished computer/docking station system—in other words, build an extremely high degree of relative positional accuracy into the system. This approach, despite its straightforward logic, unfortunately tends to greatly increase the overall cost of the system.

Another recently proposed solution is to mount the docking station connector for floating movement relative to the balance of the docking station in a manner such that when the computer connector initially contacts the docking station connector a misalignment between the two connectors causes the computer connector to forcibly shift the docking station connector into alignment therewith so that the two connectors telescopingly mate as the computer is driven to its final docked orientation. Because the docking station connector "floats" relative to the balance of the docking station structure its available compensating movement substantially reduces the alignment accuracy, and thus the cost, required in the construction of the overall computer/docking station system.

However, previously proposed floating docking station connector structures of this general type tend to present certain problems, limitations and disadvantages of their own. For example, they tend to be fairly complicated and relatively expensive. Additionally, after the docking station connector has been deflected several times in use, it tends to take a "set" and be undesirably offset from its originally intended ready-for-docking orientation within the docking station. Moreover, the floatingly supported docking station connector may be caused to rotate, thereby permitting it to be brought into a pivotally "buckled" relationship with the incoming computer connector, jamming the docking movement of the computer and preventing operative telescopic mating of the computer and docking station connectors.

In view of the foregoing it can readily be seen that it would be desirable to provide an improved floating docking station connector support structure that eliminates, or at least substantially reduces, the problems, limitations and disadvantages of previously proposed floating docking station connector support structures of the type generally described above. It is accordingly an object of the present invention to provide such improved floating docking station connector support structure.

SUMMARY OF THE INVENTION

In carrying out principles of the present invention, in accordance with a preferred embodiment thereof, computer apparatus is provided that includes a portable computer, and a docking station structure for use in operatively connecting the portable computer to external desktop computer peripheral devices, such as a monitor, keyboard and mouse operatively coupled to a system planar board or motherboard within the docking station structure.

Illustratively, the portable computer is a notebook computer having a rear side, a bottom side, and a pair of opposite side portions extending forwardly from the rear side and having outwardly projecting guide ribs thereon. A first electrical connector structure is carried on the rear side of the portable computer and is used to electrically couple the computer to the docking station motherboard to thereby operatively couple the computer to the desktop computer peripheral devices.

The docking station structure representatively includes a housing having a receiving area into which the computer may be placed and through which the computer may be slidingly moved, rear side first, rearwardly toward a docked position in which the rear side of the computer is adjacent a rear side portion of the receiving area. A second electrical connector structure is disposed within the housing and is operatively coupled to the docking station motherboard, preferably by means of a flexible ribbon type connector cable. The second electrical connector structure is telescopingly engageable with the first electrical connector structure carried on the rear side of the portable computer, and is so engaged therewith when the computer is inserted into the docking station housing receiving area and moved rearwardly therethrough to a docked orientation of the computer.

According to a key aspect of the invention, floating support means are provided for supporting the second electrical connector structure at the rear side portion of the receiving area in an initial, ready-for-docking orientation in which the second electrical connector structure is generally aligned with the first electrical connector structure as the computer approaches its docked orientation within the receiving area.

In a manner automatically compensating for translational misalignments between the first and second electrical connector structures during the computer docking procedure, the floating support means are operative to (1) resiliently bias the second electrical connector toward its initial, ready-for-docking orientation, (2) permit the second electrical connector structure to be translated away from its initial orientation, into a precisely aligned telescopable orientation with the first electrical connector structure, and thereafter permit the second electrical structure to telescopingly engage the first electrical connector structure, in response to a forcible engagement of the second electrical connector structure while the first electrical connector structure is misaligned with the second electrical connector structure during movement of the computer toward its docked orientation, and (3) prevent appreciable rotation of the second electrical connector structure relative to the first electrical connector structure, thereby substantially preventing undesirable pivotal buckling of the floatingly supported second electrical connector structure when forcibly engaged by the first electrical connector structure during docking of the computer.

The floating support means are representatively incorporated in a specially designed docking module disposed within the docking station housing and including a precision molded plastic guide tray having a rear end wall, a bottom wall, and a pair of upstanding side walls that, as the computer is inserted into the tray, slidingly engage the side ribs of the computer and horizontally guide the first electrical connector structure toward the second electrical connector structure as the computer approaches the rear end wall of the guide tray during docking of the computer. The guide tray is nestingly received within a sheet metal support tray having a rear end support wall rearwardly spaced apart from the guide tray rear end wall in a parallel, facing relationship therewith.

As representatively incorporated in the docking module, the floating support means include horizontally spaced apart first and second cylindrical members disposed between the rear tray end walls and having laterally enlarged rear end portions with peripheral ribs thereon that slidingly engage the rear end wall of the support tray. Third and fourth cylindrical members are respectively and telescopingly engaged with the first and second cylindrical members for axial movement relative thereto. The second electrical connector structure is fixedly secured to a base member that extends between and is anchored to the third and fourth cylindrical members for movement therewith.

First and second coiled cylindrical compression spring members are coaxially and captively retained within the telescoped cylindrical members. The two spring members bias the first and second cylindrical members toward engagement with the support tray rear end wall, and also bias the third and fourth cylindrical members toward engagement with conically tapered, rearwardly projecting sections of the guide tray rear end wall. With the second electrical connector structure in its initial, ready-for-docking orientation, these rearwardly projecting sections complementarily engage conically tapered interior surface portions of the third and fourth cylindrical members.

The first electrical connector structure has a spaced pair of guide sockets therein that have outwardly flared, conically tapered outer end surface portions, and the second electrical connector structure has a pair of outwardly projecting guide pins having tapered outer end portions and configured to enter the guide sockets in a manner precisely aligning the first and second electrical connector structures prior to their operative telescoping engagement at the completion of the computer docking process.

As the outer ends of the guide pins initially enter the guide sockets, a misalignment between the two connector structures causes the guide pins to be laterally shifted into precise coaxial alignment with the guide sockets as the second electrical connector structure is rearwardly shifted against the resilient biasing force of the floating support structure spring members. The forced lateral shifting of the guide pins also translationally shifts the second electrical connector structure, in a direction transverse to the rearward docking movement of the computer, in a manner causing the first and second cylindrical members to slide along the rear end wall of the support tray.

The piston-like movement of the third and fourth cylindrical members respectively into the first and second cylindrical members, coupled with the reactive forces of the enlarged rear end portions of the first and second cylindrical members as the third and fourth cylindrical members are rearwardly deflected away from the conically tapered portions of the guide tray rear end wall, substantially prevents rotation of the second electrical connector structure relative to the guide tray, thereby preventing undesirable pivotal buckling of the second electrical connector structure during docking of the computer.

In a manner similar to that illustrated and described in the copending U.S. patent Ser. No. 08/000,858 incorporated herein by reference, the manually inserted portable computer is automatically motor-driven to its docked orientation. However, the floating docking station electrical connector support means of the present invention could also be advantageously utilized in docking stations in which the computer is both manually inserted into the docking station and then manually docked therein.

DETAILED DESCRIPTION

Figure 1:
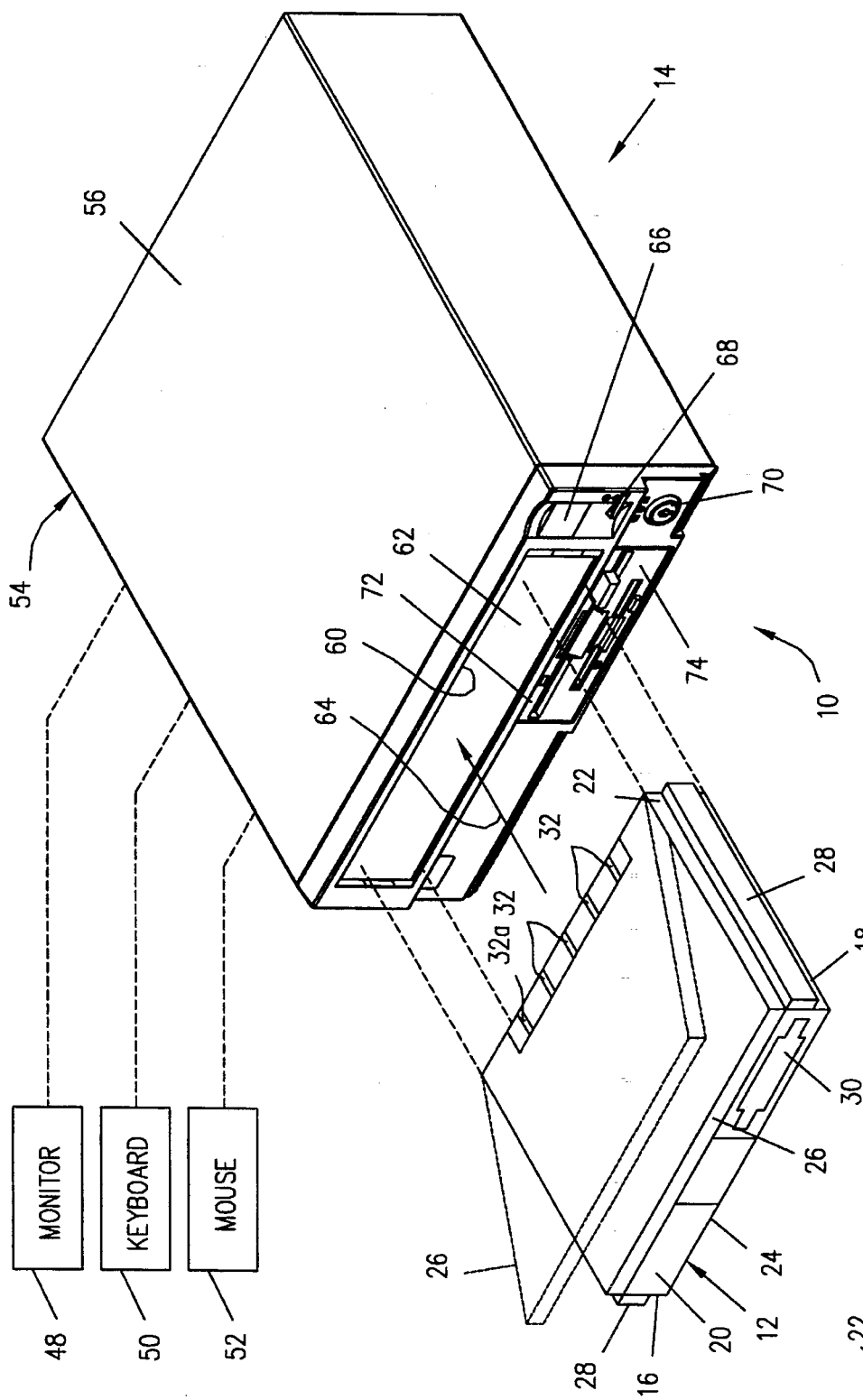
FIG. 1 is a somewhat simplified front and right side partially exploded perspective view of a specially designed notebook computer, and an associated expansion chassis docking station, embodying principles of the present invention.
Figure 1A:
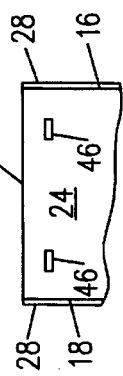
FIG. 1A is a partial bottom plan view of the notebook computer.
Figure 2:
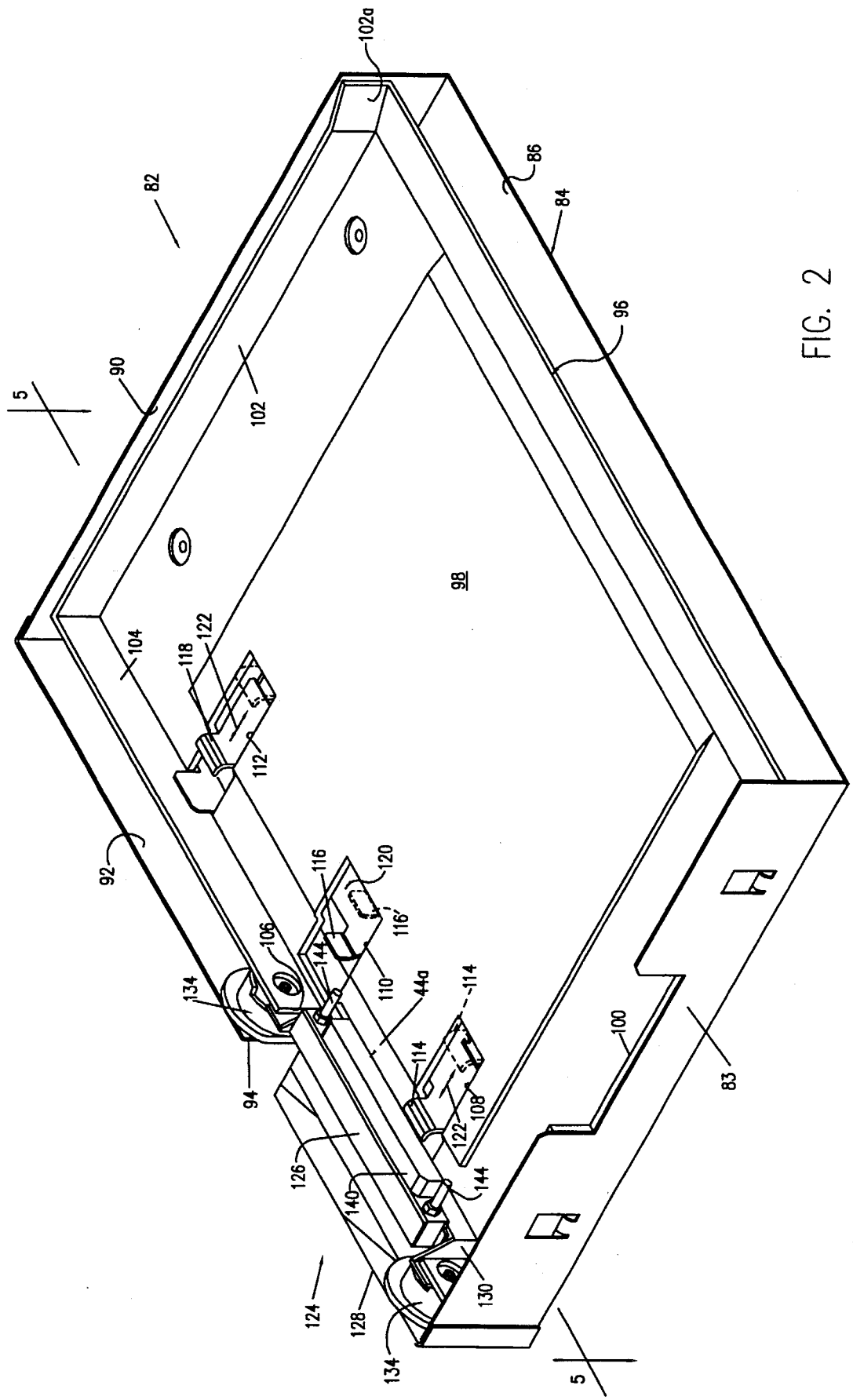
FIG. 2 is an enlarged scale front side perspective view of an interior docking module portion of the expansion chassis.
Figure 3:
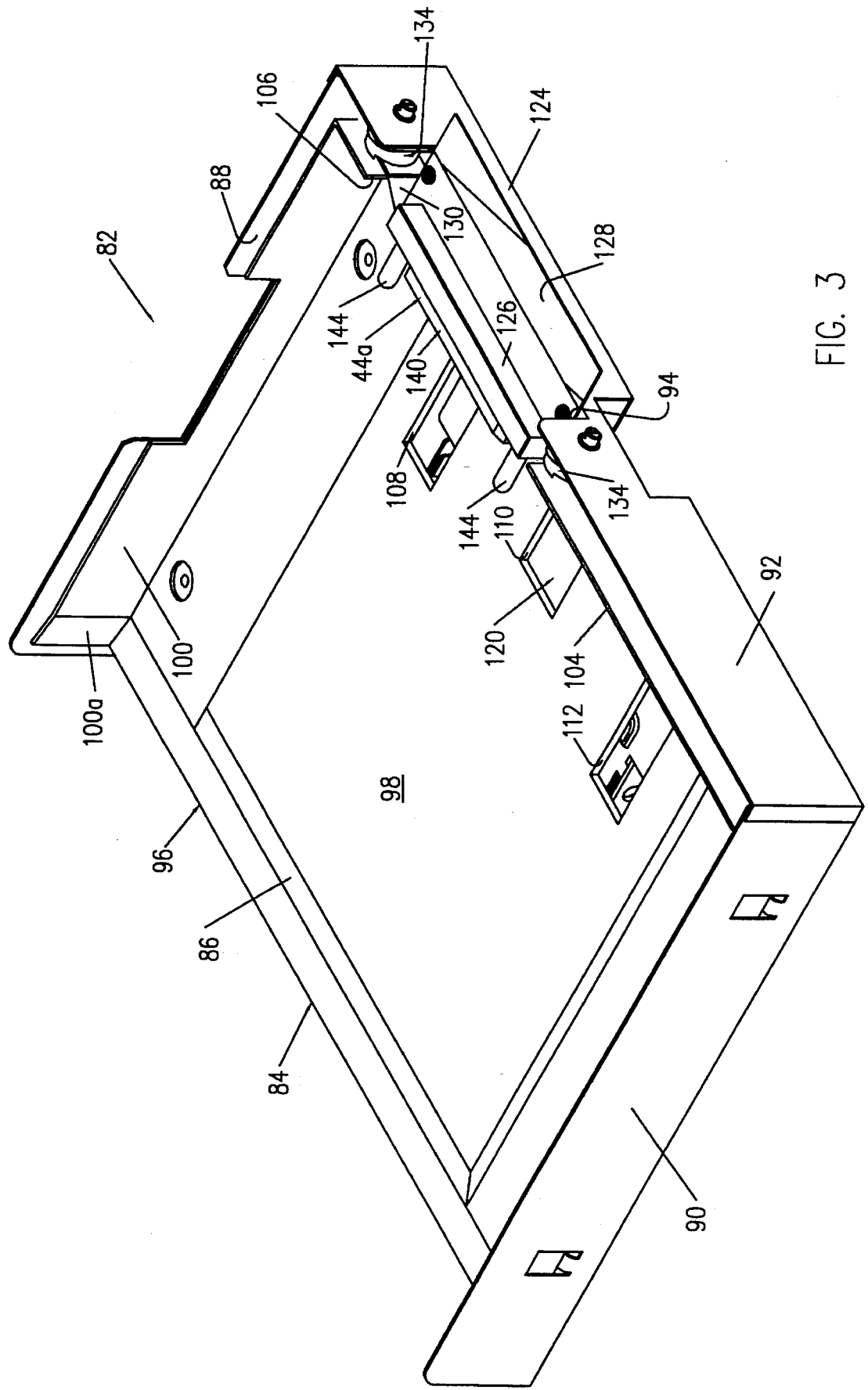
FIG. 3 is an enlarged scale rear side perspective view of the docking module.

Referring initially to FIGS. 1 and 1A, the present invention provides a specially designed portable computer/expansion chassis docking system 10 including a notebook computer 12 and a docking station structure or expansion chassis 14, hereinafter referred to simply as the "docking station." Notebook computer 12 is of a relatively thin rectangular configuration and has a body portion with left and right sides 16 and 18, front and rear sides 20 and 22, and a bottom side 24.

Pivotally secured to the top side of the computer body portion is a rectangular lid 26 which, as indicated in phantom in FIG. 1, may be pivoted upwardly in the usual manner to expose a keyboard (not shown) on the top side of the computer body, and a display screen (also not shown) on the underside of the lid 26. For purposes later described, a pair of generally rectangularly configured guide rails 28 longitudinally extend along the left and right side walls 16 and 18, adjacent the bottom side 24, and laterally project outwardly therefrom. In a conventional manner, the notebook computer 12 has a variety of internally mounted operating components (not illustrated) including a hard drive, a floppy drive having a disc insertion slot 30 on the front side 20 of the computer body, and a motherboard.

Referring now to FIGS. 5A–5E, a rectangular opening 36 is centrally formed in the back side 22 of the computer body and may be selectively covered and uncovered by a sliding door plate (not shown) carried on the rear side 22 of the computer 12. When the door plate is opened, the opening 36 exposes a recessed, high density male electrical pin type connector section 44. Connector section 44 has an elongated rectangular configuration and has a pair of rearwardly opening cylindrical guide sockets 45 at its opposite ends. Guide sockets 45 have outwardly flared outer end portions 45a. For purposes later described, drive indentations 46 (FIG. 1A) are formed in the bottom side 24 of the computer adjacent its rear side 22.

Referring again to FIG. 1, the docking station 14 is considerably larger than the notebook computer 12, has a rectangular configuration, and is adapted to rest on the table or desk portion of a home or office computer work station. As schematically depicted in FIG. 1, the docking station is representatively connected to conventional external desktop computer peripheral devices such a monitor 48, a keyboard 50 and a mouse 52. Docking station 14 includes a housing 54 having a top cover portion 56 which is removable from a bottom wall portion 58 of the housing to expose the operating components within the docking station.

Extending along the front side of the docking station 14 is a horizontally elongated rectangular opening 60 which is normally covered by a door plate 62. Door plate 62 is connected along its lower side edge to the docking station for downward and rearward pivotal motion into the interior of the docking station, and is spring-biased toward its upright position, shown in FIG. 1, in which it covers the opening 60.

The notebook computer 12 is rearwardly insertable into the docking station 14 through the opening 60 as indicated by the arrow 64 in FIG. 1. In a manner subsequently described, a motorized drive system (not shown) within the docking station 14 operates in response to this manual insertion of the notebook computer to further translate it and automatically connect it to peripheral devices such as the external peripheral devices 48, 50 and 52 through circuitry in the docking station 14. The motorized drive system is similar in construction and operation to the drive system illustrated and described in U.S. Pat. No. 5,313,596 incorporated herein by reference, and is also selectively operable to drivingly eject the inserted computer outwardly through the opening 60 and automatically disconnect it from the docking station.

Immediately to the right of the pivotable door plate 60 are a display window 66, for example, a four character LCD display, in which various docking station operating indicia of the docking station are automatically displayed, an "on/off/eject" switch 68, and a key lock 70 for the docking station. Exposed beneath the door plate 62 are the front ends of a 3.5" floppy disc drive 72 and a 5.25" floppy disc drive 74.

Referring again to FIGS. 5A–5E, the docking station 14 has internally mounted therein a system planar board or motherboard 80. As opposed to the motherboard normally incorporated in a computer (such as the motherboard in the notebook computer 12), the planar board 80 does not provide full computer processing control. It is thus considerably simpler, smaller and less expensive than the usual desktop motherboard and functions instead merely to control the operation of the previously mentioned motorized docking system, control the energization of the notebook computer 12 and selected operating components of the docking station 14 to prevent potentially damaging voltage mismatches, provide an operative interface between the internal operating components in the docking station and notebook computer, and link the docked notebook computer to the docking station drives and the external peripheral devices 48, 50 and 52 as described in detail in U.S. Pat. No. 5,313,596.

Accordingly, the overall cost of the desktop portion of the system 10 is considerably reduced compared to a conventionally constructed desktop computing system. When the notebook computer 12 is operatively disposed within the docking station 14, the resulting desktop computing system utilizes the notebook computer motherboard as its main processing circuitry and permits the use of the desktop peripheral devices in place of the corresponding components on the notebook computer. The user is thus provided with the advantages of both a notebook computer and a desktop computer system at a considerable reduction in cost.

Also disposed in the interior of the docking station 14 is a specially designed docking module 82 embodying principles of the present invention and illustrated in FIGS. 2–4 and 5A–5E. The docking module 82 is positioned immediately behind the docking station door plate 62 (see FIG. 1) and includes a rectangular sheet metal support tray 84 having open front and top sides, a bottom wall 86, upstanding left and right side walls 88 and 90, and an upstanding rear side wall 92 having a cutout area 94 formed in its top side edge.

A precision molded plastic guide tray 96 has a rectangular configuration and is nestingly received in and fixedly secured to the sheet metal support tray 84. The guide tray 96 has open top and front sides, a bottom wall 98, upstanding left and right side walls 100 and 102 adjacent and parallel to the support tray side walls 88 and 90, and an upstanding rear side wall 104 parallel to and spaced forwardly apart from the rear side wall 92 of the sheet metal support tray 84. As illustrated, the rear side wall 104 of the plastic tray has a cutout area 106 formed therein and aligned with the cutout area 94 in the rear metal side wall 92. For purposes later described, front end portions 100a, 102a of the plastic tray side walls 100 and 102 are outwardly flared.

Rectangular openings 108, 110 and 112 are formed in the plastic tray bottom wall 98 adjacent the rear plastic tray wall 104. Respectively projecting upwardly through these three openings are transverse tabs 114, 116, 118 formed on a tiltable metal travel plate member 120 sandwiched between the bottom walls 86 and 98 of the metal and plastic tray structures 84 and 96. The travel plate 120 is operatively connected to the docking system drive motor (not shown) and is forwardly and rearwardly drivable thereby relative to the tray structures 84, 96 as indicated by the double-ended arrow 122 in FIGS. 2 and 4. Travel plate tabs 114 and 118 are configured and spaced apart a distance permitting them to enter the underside drive depressions 46 on the notebook computer 12 (see FIG. 1A) when the computer 12 is inserted into the docking station 14 as subsequently described herein.

Figure 4:
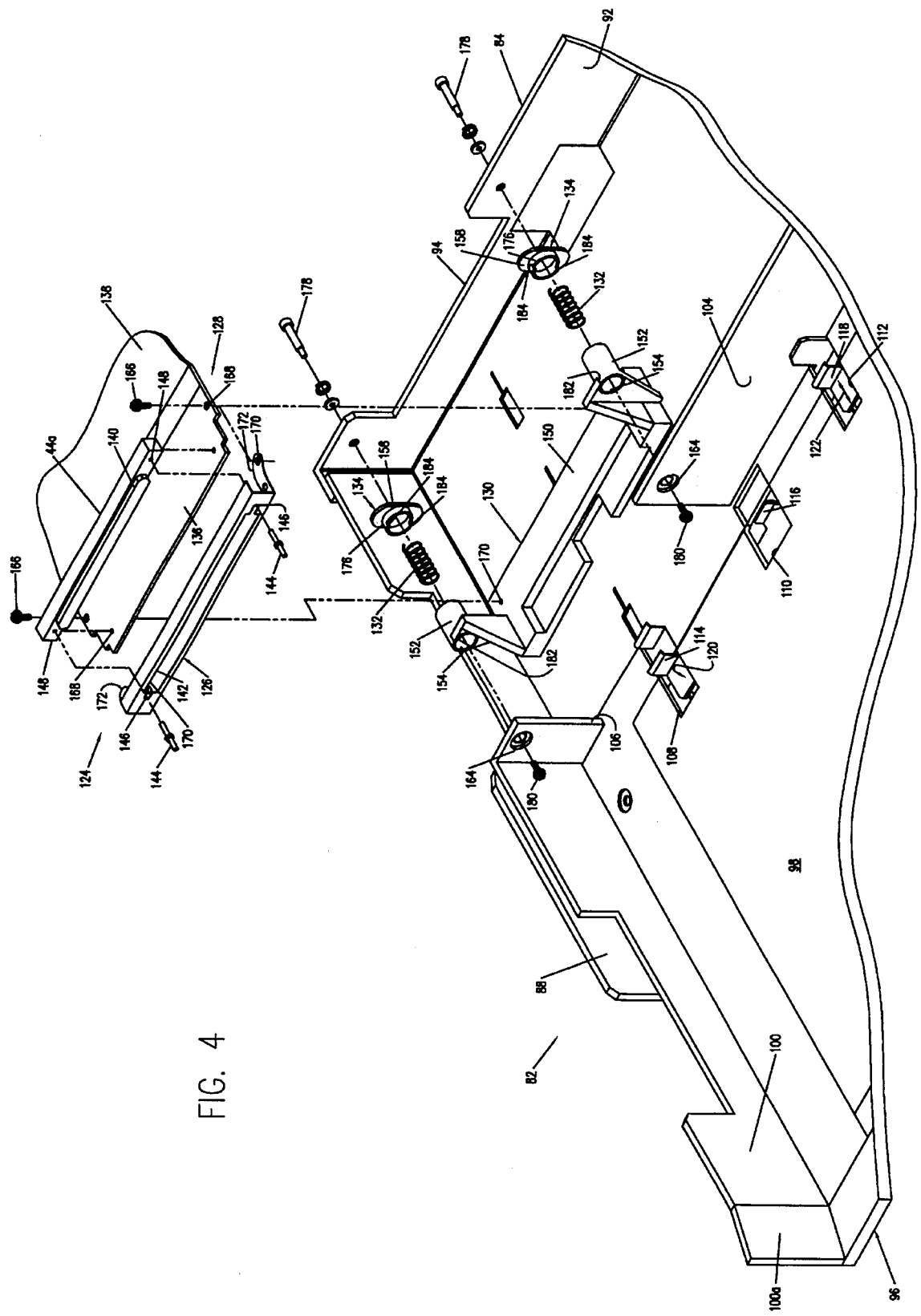
FIG. 4 is an enlarged scale exploded front side perspective view of a portion of the docking module.

According to a key aspect of the present invention, a female pin connector portion 44a is supported, for releasable mating engagement with the male pin connector portion 44, in a specially designed floating connector interface structure 124 secured to the back sides of the tray structures 84, 96 at their rear side wall cutout areas 94, 106. Referring now to FIG. 4, the floating connector interface structure 124 includes a bent rectangular metal backing plate 126, a rectangular rigidizer board 128, a precision molded connector housing structure 130, a pair of cylindrical compression spring members 132, and a pair of anti-rotation cap members 134.

Figure 5A:
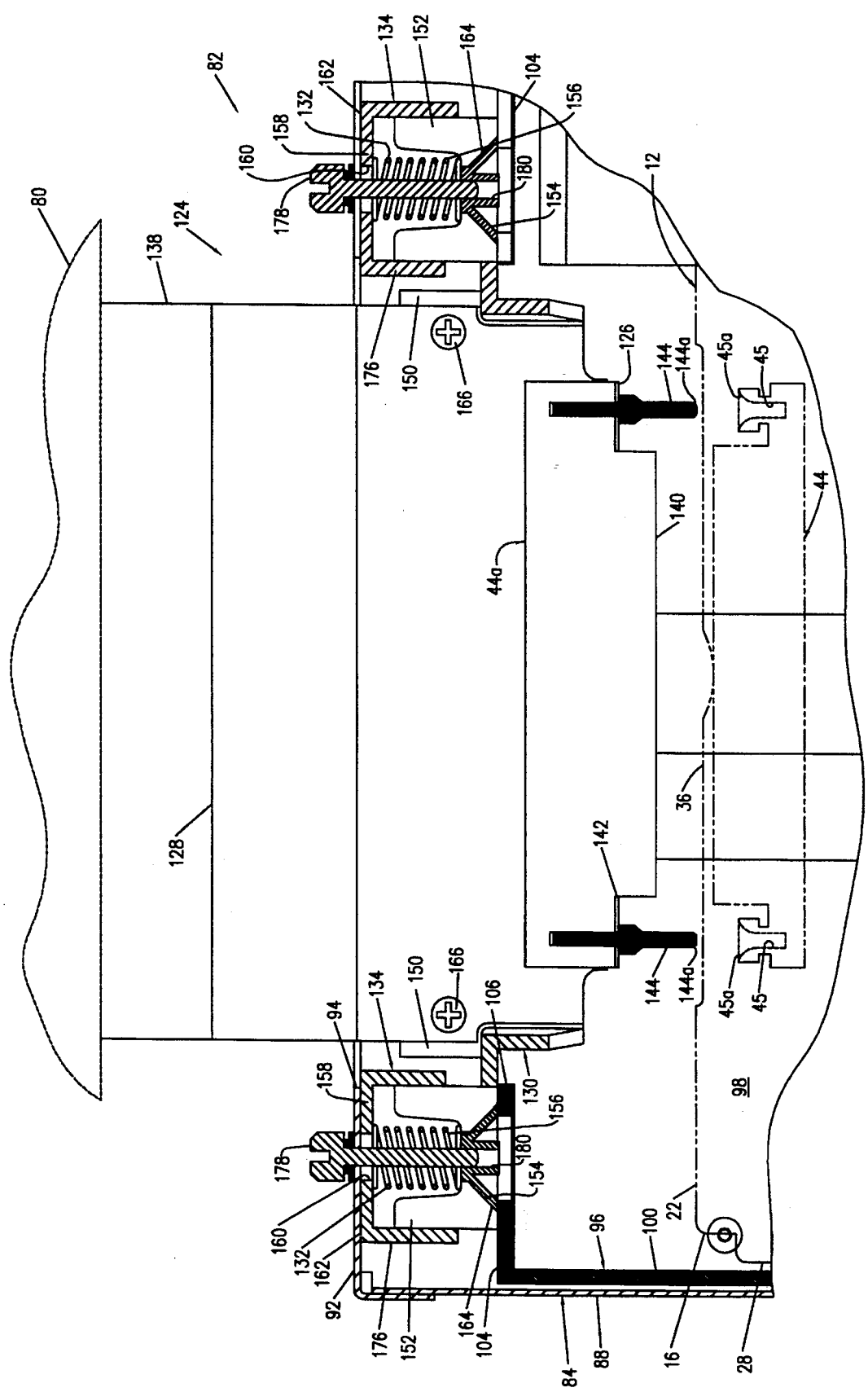
FIGS. 5A–5E are enlarged scale partial cross-sectional views through the docking module, taken along line 5—5 of FIG. 2, and sequentially illustrate the operation of a specially designed floating connector interface structure incorporated therein.

The female connector portion 44a has connector pins (not visible) disposed on its bottom side and received in corresponding openings 136 in the rigidizer board 128 and electrically coupling the connector portion 44a to a flexible ribbon type cable connector 138 secured to the rigidizer board 128, extending rearwardly therefrom, and operatively connected to the docking station motherboard 80 as shown in FIG. 5A.

Referring now to FIGS. 2–5A, an outwardly projecting front side portion 140 of the female connector 44a forwardly extends through a complementarily configured opening 142 in the front side of the bent connector backing plate 126, and a pair of guide pins 144 are rearwardly extended through opposite end slots 146 in the backing plate 126 and threaded into end openings 148 in the female connector 44a, thereby anchoring the connector 44a within the interior of the bent connector backing plate 126. As best illustrated in FIG. 5A, the guide pins 144 project forwardly beyond the connector front side portion 140 and have conically tapered front end portions 144a.

The precision molded plastic connector housing 130 has a central rectangular base plate portion 150 at the opposite ends of which a pair of hollow cylindrical end members 152 are disposed. Front end portions of the openings extending through the end members 152 are conically tapered, as at 154, and are positioned just forwardly of annular, rearwardly facing interior ledges 156 within the end members 152.

The molded plastic anti-rotation cap members 134 are disposed in the space between the rear tray side walls 92 and 104 and have vertically elongated base portions 158 with central openings 160 extending therethrough, and rearwardly projecting peripheral ribs 162 that slidingly bear against the rear side wall 92 of the sheet metal support tray 84. The central base plate portion 150 of the connector housing 130 is received in the cutout area 106 of the rear plastic tray side wall 104, with the conical end member surfaces 154 complementarily engaging rearwardly projecting conically tapered hollow portions 164 of the plastic tray rear side wall 104 on opposite sides of the cutout area 106.

Screws 166 extend downwardly through openings 168 in the rigidizer board 128 (see FIG. 4) and holes 170 in mounting tab portions 172 of the connector backing plate 126, and are threaded into corresponding openings 174 in the base plate portion 150 of the connector housing 130, thereby anchoring the connector 44a to the connector housing 130. The connector housing end members 152 are telescopingly and slidingly received, piston-like, in the interiors of hollow cylindrical body portions 176 of the anti-rotation caps 134 and project forwardly beyond their base portions 158. As best illustrated in FIG. 4, the base portions 158 are vertically enlarged relative to the cylindrical body portions 176.

The anti-rotation caps 134, and the connector housing end members 152 that they slidingly receive, are locked into place within the space between the rear tray side walls 92 and 104 by screws 178 extending through the rear tray side wall 92, and the interiors of the anti-rotation caps 134 and the end members 152, and screwed into threaded inserts 180 received in the tapered wall portions 164 as best illustrated in FIG. 5A. The spring members 132 are coaxially and captively retained within the cap members 134 and the cylindrical end members 152 and bear at their opposite ends against the annular ledges 156 and the inner side surfaces of the base portions 158 of the anti-rotation caps 134. Cooperating, diametrically opposite abutment surfaces 182, 184 respectively formed on the end members 152 and the cap member body portions 176 engage one another in a manner maintaining the cap member base portions 158 in their illustrated vertically elongated orientations.

With the floating connector interface structure 124 in its FIG. 5A "ready for docking" position, the springs 132 are slightly compressed and force the conically tapered interior surfaces 154 of the connector housing end members 152 forwardly into concentric abutment with the tapered wall portions 164 of the rear plastic tray side wall 104. When the computer 12 is manually inserted rearwardly into the interior of the docking station 14, through its pivoted door plate 62, the guide ribs 28 on the computer slidingly engage the opposite side walls 100, 102 of the plastic guide tray 96 and align the inserted computer in a left-to-right horizontal direction relative to the floating connector interface structure 124, thereby tending to similarly align the computer and docking station connectors 44, 44a. During initial insertion of the computer 12 into the interior of the docking station 14, the upwardly projecting travel plate tabs 114, 116 are in their dotted line positions shown in FIG. 2. The outwardly flared plastic tray side wall portions 100a, 102a (see FIGS. 2 and 3) help to properly guide the computer into the interior of the docking station.

As the computer 12 is manually inserted into the interior of the docking station 14, a rear end portion of the computer rides up and over the tabs 114 until the tabs 114 enter the drive depressions 46 (FIG. 1A) on the underside of the computer. When the rear end portion of the computer comes back to rest on the bottom tray wall 98 it downwardly engages the tab 116 to thereby cause the travel plate 120 to tilt rearwardly and downwardly. This rearward and downward tilting of the travel plate 120 energizes a switch (not shown) which, in turn, operates the docking station drive motor (also not shown) to drive the travel plate 120 rearwardly, thereby moving the tabs 114, 116 from their dotted line positions in FIG. 2 to their solid line positions and correspondingly driving the inserted computer toward the connector portion 44a to operatively mate the connector portions 44, 44a and dock the inserted computer.

Figure 5B:
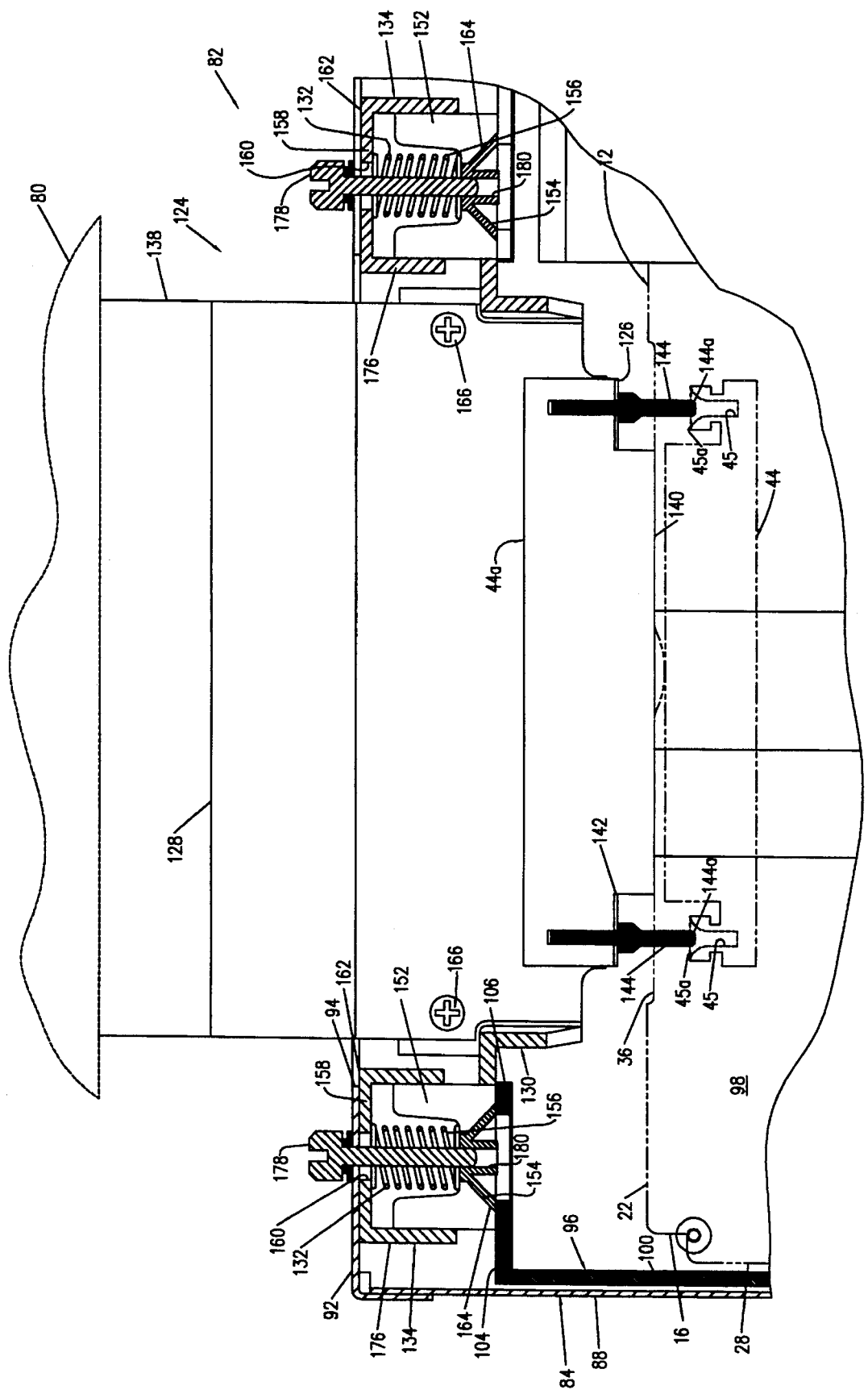

To illustrate the unique operation of the floating connector interface structure 124 it will be assumed that as the inserted computer 12 initially approaches the docking station connector portion 44a, as illustrated in FIG. 5B, the computer connector portion 44 is offset slightly leftwardly relative to the docking station connector portion 44a. As the outer ends of the guide pins 144 begin to enter the corresponding guide sockets 45 right side portions of the tapered socket end portions 45a engage the tapered front or outer ends 144a of the pins 144 and exert leftwardly and rearwardly directed camming forces on the pins 144 and thus the docking station connector portion 44a.

Figure 5C:
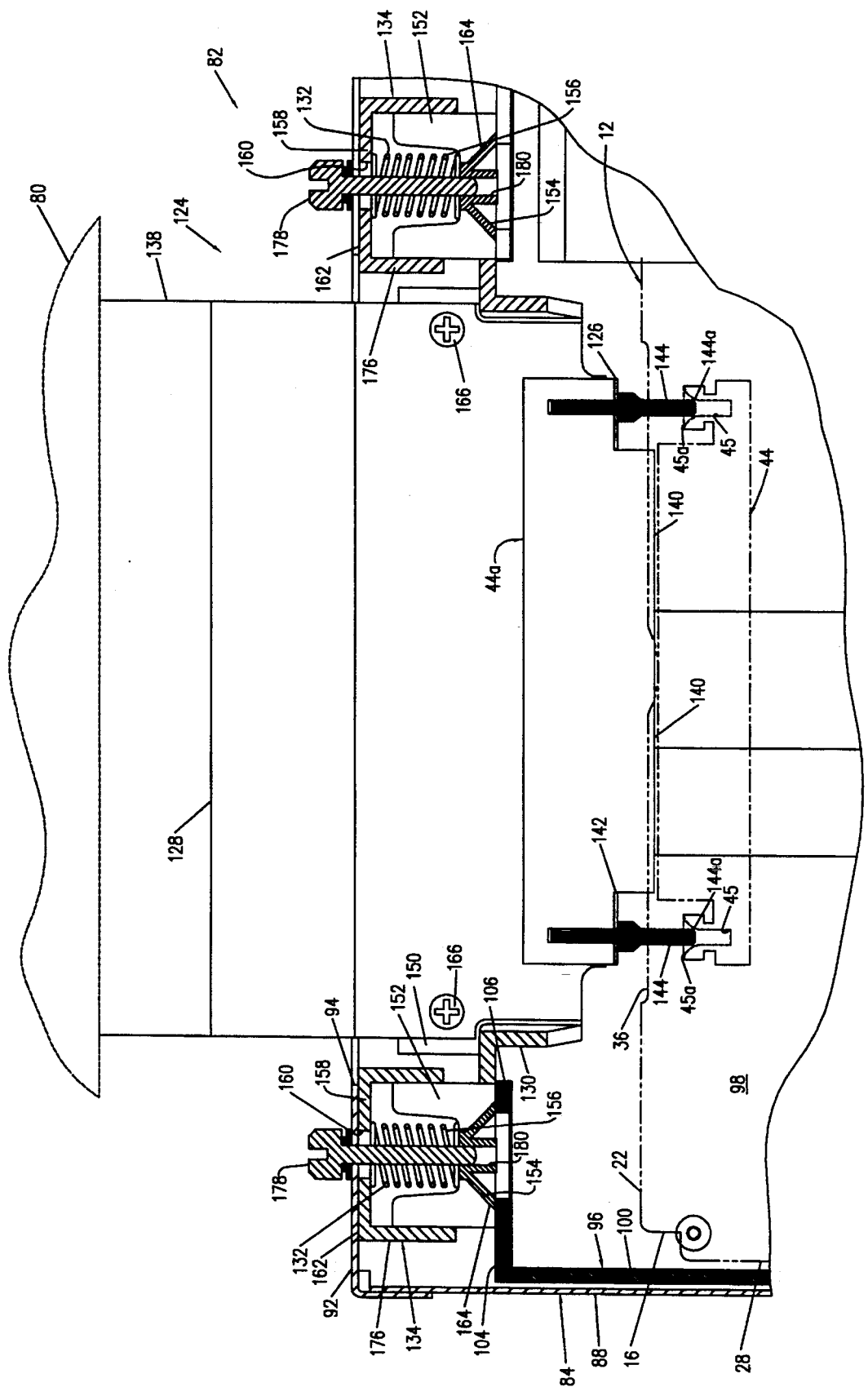

As may be seen by comparing FIGS. 5B and 5C, this rearward and leftwardly directed camming force exerted on the pins 144 rearwardly and leftwardly translates the connector portion 44a, in turn axially pushing the cylindrical end members 152 into the cap member body portions 176 against the resilient resistive forces of the spring members 132 and sliding the cap member body portions 176 leftwardly along the rear wall 92 of the sheet metal support tray 84. The rearward and leftwardly directed translational motion of the cylindrical end members 152 slides them rearwardly and leftwardly along the conically tapered rear wall portions 164 of the plastic guide tray 96 as the axes of the guide pins 144 are translated leftwardly toward alignment with the axes of the guide sockets 45.

Figure 5D:
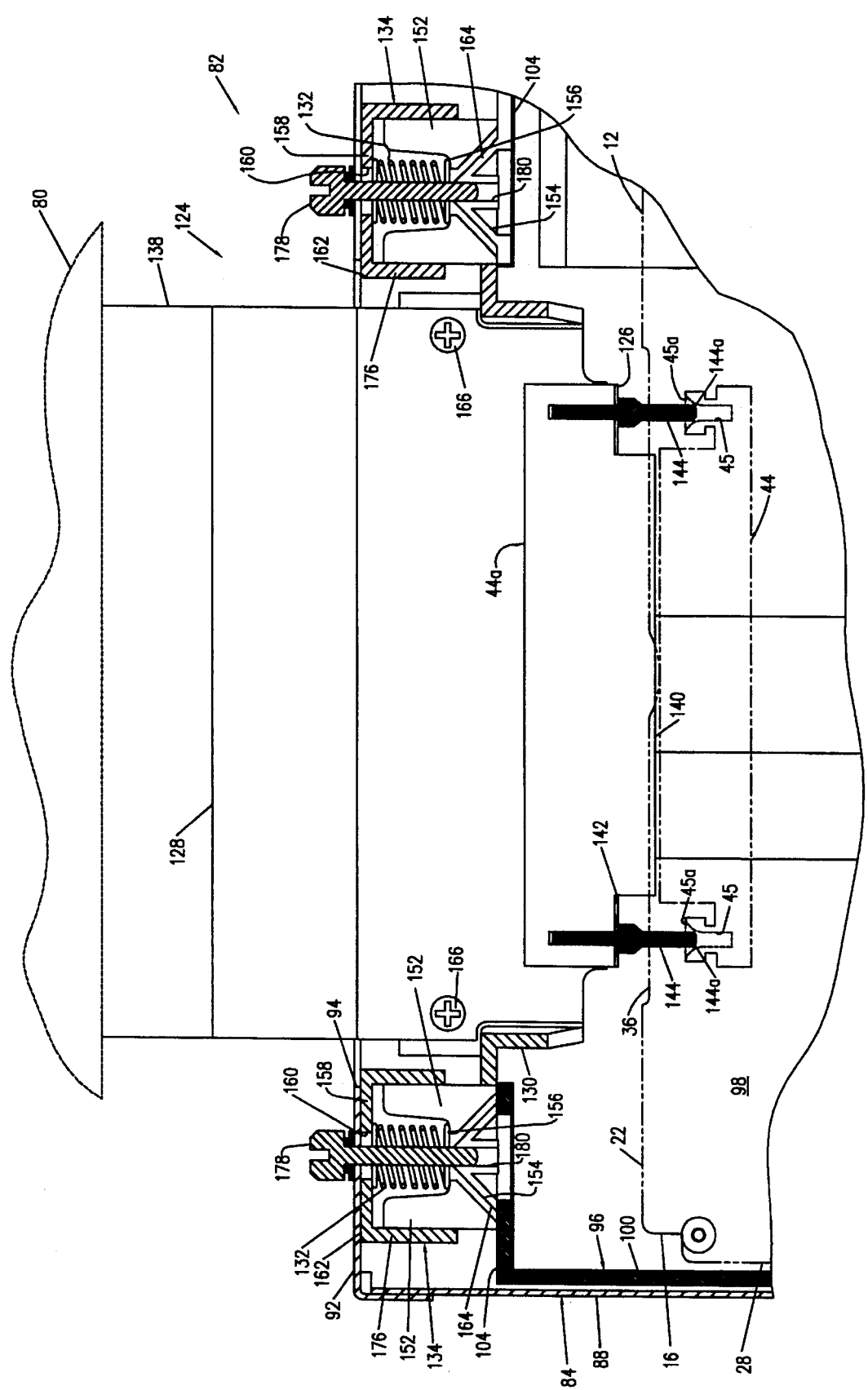
Figure 5E:
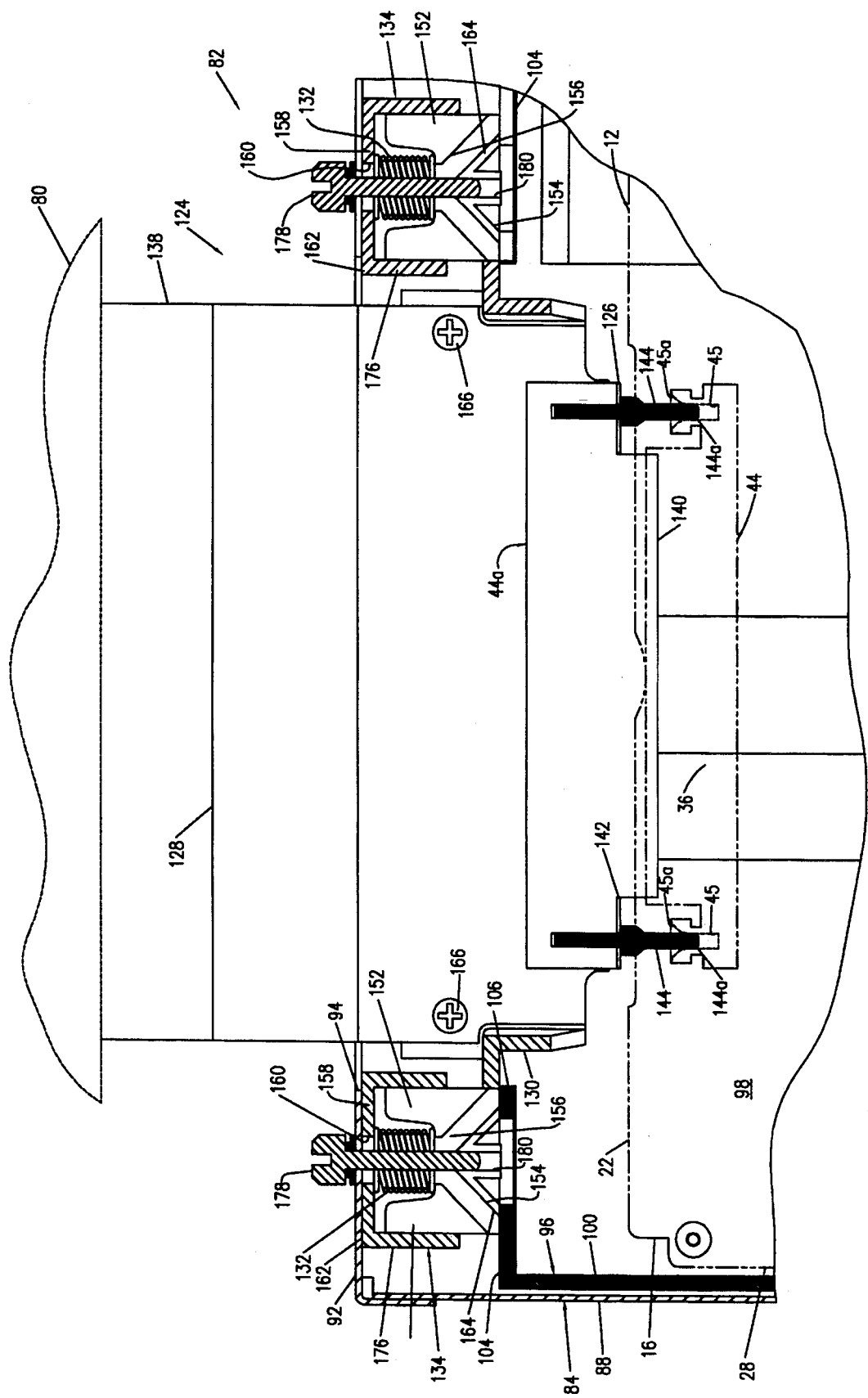

When a further rearward and leftward translation of the connector portion 44a brings the axes of the guide pins 144 into alignment with the axes of the guide sockets 45, as illustrated in FIG. 5D, the sliding translation of the cap members 134 and the cylindrical end members 152 stops, and further rearward movement of the computer 12 toward the docking station connector portion 44a drives the pins 144 into the sockets 45 (as illustrated in FIG. 5E) while rearwardly driving the cylindrical end members 152 off the tapered wall portions 164 against the resilient force of the springs 132 and further driving the cylindrical end members 152 piston-like into the body portions 176. As the pins 144 bottom out in the guide sockets 45 the connector portions 44 and 44a are brought into telescopingly mated engagement and the computer is operatively docked. When the computer 12 is subsequently removed from the docking station 14, and the pins 144 are removed from their associated guide sockets 45, the springs 132 automatically return the docking station connector portion 44a and the floating connector interface structure 124 to their FIG. 5A "ready for docking" positions.

As can be seen from the foregoing description, a misalignment between the connector portions 44, 44a during the docking of the computer 12 automatically translates the connector portion 44a relative to the plastic support tray 96 into precise mateable alignment with the computer connector portion 44. This automatic floating alignment occurs when, as described above, the connector sockets 45 are initially shifted relative to the guide pins 144 in a left-to-right direction, and also occurs when the sockets 45 are initially shifted relative to the guide pins 144 in a vertical direction, or when the sockets 45 are initially shifted relative to the guide pins 144 in both horizontal and vertical directions. Due to its unique support by the connector interface structure 124, the connector portion 44a can be translated rearwardly, and in any direction in a vertical plane, in response to an initial docking misalignment between the mateable connector portions 44 and 44a.

Docking force-created rotation of the connector portion 44a, which could create undesirable "buckling" between the connector portions 44 and 44a, is substantially prevented by the unique construction and operation of the floating connector interface structure 124 in a manner which will now be described. As sequentially illustrated in FIGS. 5A–5E, as the connector portion 44a is pushed rearwardly during the initial misaligned contact between the connector portions 44 and 44a, the cylindrical end members 152 are driven in a piston-like manner into their associated anti-rotation cap members 134 as the cap members are slidingly translated along the rear metal support tray wall 92.

This piston-like interfit between the interface structure members 152 and 134 caused the cap members 134 to inhibit rotation of the connector portion 44a relative to the plastic guide tray 96. Such anti-rotation characteristic of the cap members 134 is augmented by the fact that the rear end faces of the cap members 134 have areas larger than the maximum cross-sectional areas of the cylindrical end members 152 which they telescopingly receive. Accordingly, the diametrically larger rear walls of the cap members 134 act, in effect, as "outriggers" to inhibit pivotal tipping of the end members 152 and thus the connector portion 44a.

As will be appreciated, the sliding engagement between the computer housing side ribs 28 and the opposite side walls 100, 102 of the plastic guide tray 96 substantially inhibit the inserted computer 12 from pivoting from side to side as the computer approaches the connector portion 44a during docking of the computer. However, the computer may in certain circumstances be slightly offset in a vertical sense as it approaches the connector portion 44a, and thereby exert a vertical pivoting force on the connector portion 44a when the misaligned pins 144 and sockets 45 initially engage one another. The vertical elongation of the cap member base portions 158 (see FIGS. 2 and 4) provides the cap members 134 with increased anti-rotation reactive forces when such vertical pivoting forces are encountered by the connector portion 44a.

The sliding of the cap member base portions 158 along the rear sheet metal support tray wall 92 in response to translational deflection of the anti-rotation cap members 134 is facilitated by the peripheral ribs 162 formed on the rear sides of the cap member base portions 158. These ribs 162 reduce the contact area, and thus the friction, between the cap members 134 and the tray wall 92.

It should be noted that in addition to the tolerance compensation benefits provided by the floating connector interface structure 124, the overall potential for misalignment between the connector portions 44, 44a is reduced by other constructional aspects of the illustrated docking station structure 14. For example, the use of precision molded plastic to form the guide tray 96 (as opposed, for example, to sheet metal) serves to provide precise side-to-side positioning of the computer 12 as it approaches the docking station connector portion 44a. Moreover, as described above, the floating connector interface structure 124 is anchored directly to the precision molded plastic tray 96 and, in its FIG. 5A ready-for-docking position, is thus very precisely aligned with the incoming computer.

As can be seen from the foregoing, the floating connector interface structure 124 of the present invention is quite simple in construction and may be relatively inexpensively fabricated and installed in the docking station. While the interface structure 124 has been representatively illustrated as being used in conjunction with a motor-driven docking station, it will be readily appreciated by those skilled in this art that it could also be advantageously incorporated in a docking station in which the inserted portable computer was operatively coupled to the connector portion 44a using only manual insertion and docking forces.

The foregoing detailed description is to be clearly understood as being given by way of illustration and example only, the spirit and scope of the present invention being limited solely by the appended claims.

What is claimed is:

1. Connector apparatus for use in operatively and electrically coupling a first electrical connector structure carried by a portable computer to a docking station structure having a receiving area into which the portable computer may be inserted in a first direction toward a docked orientation of the computer, said connector apparatus comprising:

a second electrical connector structure telescopingly engageable with the first electrical connector structure; and floating support means for supporting said second electrical connector structure within the receiving area in a manner such that said second electrical connector structure will be forcibly engaged by the first electrical connector structure as the computer approaches its docked orientation within the receiving area, said floating support means being operative to resiliently bias said second electrical connector structure toward a ready-for-docking position, permit said second electrical connector structure to be translated away from said ready-for-docking position and into precise telescopingly mateable alignment with the first electrical connector structure in response to a forcible, misaligned engagement of said second electrical connector structure by the first electrical connector structure as the computer moves in said first direction toward its docked orientation, and substantially prevent rotation of said second electrical connector structure relative to the first electrical connector structure, said floating support means including:

first and second facing wall structures spaced apart in a first direction, first and second cylindrical members disposed between said first and second facing wall structures, spaced apart in a direction transverse to said first direction, and having first ends slidably engaging said first wall structure, third and fourth cylindrical members respectively and telescopingly engaged with said first and second cylindrical members for axial movement relative thereto, a base member extending between and anchored to said third and fourth cylindrical members for movement therewith, said second electrical connector structure being fixedly secured to said base member for movement therewith, and first and second springs biasing said first and second cylindrical members toward engagement with said first wall structure, and biasing said third and fourth cylindrical members toward engagement with said second wall structure.

2. The connector apparatus of claim 1 wherein:

said first and second springs are cylindrically coiled compression springs, with said first spring being coaxially and captively retained within the telescoped first and third cylindrical members, and said second spring being coaxially and captively retained within the telescoped second and fourth cylindrical members.

3. The connector apparatus of claim 1 wherein:

said third and fourth cylindrical members have end portions facing said second wall structure and having conically tapered interior side surfaces, said second wall structure has a pair of conically tapered sections projecting toward said first wall structure, said conically tapered sections being complementarily configured relative to said conically tapered interior side surfaces of said third and fourth cylindrical member end portions and receivable in said end portions, and said first and second springs bias said conically tapered interior side surfaces of said third and fourth cylindrical members into complementary abutment with said pair of conically tapered sections of said second wall structure.

4. The connector apparatus of claim 1 wherein:

said first ends of said first and second cylindrical members are transversely enlarged relative to the balances of said first and second cylindrical members and have peripheral rib portions that slidingly engage said first wall structure.

5. The connector apparatus of claim 1 wherein:

said second electrical connector structure has a spaced pair of outwardly projecting guide pins disposed thereon and having tapered outer ends, and the first electrical connector structure has a spaced pair of guide sockets adapted to receive said guide pins, the guide sockets each having outwardly flared outer end surfaces.

6. A docking station structure for removably connecting a portable computer to external computer peripheral devices, such as a monitor, keyboard and mouse, the computer having on a rear side thereof a first electrical connector structure, said docking station structure comprising:

a housing having a receiving area into which the computer may be placed and through which the computer may be slidingly moved, rear side first, rearwardly toward a docked position in which said rear side of the computer is adjacent a rear side portion of said receiving area;

a second electrical connector structure operatively associatable with the peripheral devices and telescopingly engageable with said first electrical connector structure; and floating support means for supporting said second electrical connector structure at said rear side portion of said receiving area in an initial orientation in which said second electrical connector structure is generally aligned with the first electrical connector structure as the computer approaches its docked position within said receiving area, said floating support means being operative to:

(1) resiliently bias said second electrical connector structure toward said initial orientation thereof, (2) permit said second electrical connector structure to be translated away from said initial orientation, into a precisely aligned telescopable orientation with the first electrical connector structure, and thereafter permit said second electrical connector structure to telescopingly engage the first electrical connector structure, in response to a forcible engagement of said second electrical connector structure by the first electrical connector structure while the first electrical connector structure is misaligned with said second electrical connector structure during movement of the computer toward its docked position, and (3) prevent appreciable rotation of said second electrical connector structure relative to the first electrical connector structure, said floating support means including:

a first wall structure, a second wall structure facing and generally parallel to said first wall structure and forwardly spaced apart therefrom, first and second spaced apart cylindrical members disposed between said first and second facing wall structures and having first ends slidably engaging said first wall structure, third and fourth cylindrical members respectively and telescopingly engaged with said first and second cylindrical members for axial movement relative thereto, a base member extending between and anchored to said third and fourth cylindrical members for movement therewith, said second electrical connector structure being fixedly secured to said base member for movement therewith, and first and second springs biasing said first and second cylindrical members toward engagement with said first wall structure, and biasing said third and fourth cylindrical members toward engagement with said second wall structure.

7. The docking station structure of claim 6 wherein:

said first and second springs are cylindrically coiled compression springs, with said first spring being coaxially and captively retained within the telescoped first and third cylindrical members, and said second spring being coaxially and captively retained within the telescoped second and fourth cylindrical members.

8. The docking station structure of claim 6 wherein:

said third and fourth cylindrical members have end portions facing said second wall structure and having conically tapered interior side surfaces, said second wall structure has a pair of conically tapered sections projecting toward said first wall structure, said conically tapered sections being complementarily configured relative to said conically tapered interior side surfaces of said third and fourth cylindrical member end portions and receivable in said end portions, and said first and second springs bias said conically tapered interior side surfaces of said third and fourth cylindrical members into complementary abutment with said pair of conically tapered sections of said second wall structure.

9. The docking station structure of claim 6 wherein:

said first ends of said first and second cylindrical members are transversely enlarged relative to the balance of said first and second cylindrical members and have peripheral rib portions that slidingly engage said first wall structure.

10. The docking station structure of claim 6 wherein:

said second electrical connector structure has a spaced pair of outwardly projecting guide pins disposed thereon and having tapered outer ends, and the first electrical connector structure has a spaced pair of guide sockets adapted to receive said guide pins, the guide sockets each having outwardly flared outer end surfaces.

11. A docking module for use in a portable computer docking station, said docking module comprising:

a generally rectangular guide tray for slidably receiving a portable computer, said guide tray having an open top side, a bottom wall, a rear end wall, and a pair of opposite side walls projecting upwardly from said bottom wall and extending forwardly from said rear end wall;

a docking station electrical connector configured to telescopingly engage a complementarily configured computer electrical connector carried by a portable computer slidably receivable in said guide tray;

floating support means for associating said docking station electrical connector with said rear end wall of said guide tray in a manner (1) resiliently biasing said docking station electrical connector forwardly toward an initial, ready-for-docking position, (2) permitting said docking station electrical connector to be translationally deflected from said initial, ready-for-docking position in a rearward direction and in a direction parallel to said rear end wall, and (3) substantially preventing rotation of said docking station electrical connector relative to said guide tray while said docking station electrical connector is in its initial, ready-for-docking position or is being translationally deflected therefrom and a support wall disposed behind said rear end wall of said guide tray in a generally parallel, facing relationship therewith, said floating support means including:

first and second spaced apart cylindrical members disposed between said support wall and said rear end wall of said guide tray, and having first ends slidably engaging said support wall, third and fourth cylindrical members respectively and telescopingly engaged with said first and second cylindrical members for axial movement relative thereto, a base member extending between and anchored to said third and fourth cylindrical members for movement therewith, said docking station electrical connector being fixedly secured to said base member for movement therewith, and first and second springs biasing said first and second cylindrical members toward engagement with said support wall, and biasing said third and fourth cylindrical members toward engagement with said rear end wall of said guide tray.

12. The docking module of claim 11 wherein:

said guide tray is formed from a precision molded plastic material, and said docking module further comprises a generally rectangular sheet metal support tray nestingly receiving said guide tray, said support tray having a rear end wall defining said support wall.

13. The docking module of claim 11 wherein:

said first and second springs are cylindrically coiled compression springs, with said first spring being coaxially and captively retained within the telescoped first and third cylindrical members, and said second spring being coaxially and captively retained within the telescoped second and fourth cylindrical members.

14. The docking module of claim 11 wherein:

said third and fourth cylindrical members have end portions facing said rear guide tray end wall and having conically tapered interior side surfaces, said rear guide tray end wall has a pair of conically tapered sections projecting toward said support wall, said conically tapered sections being complementarily configured relative to said conically tapered interior side surfaces of said third and fourth cylindrical member end portions and receivable in said end portions, and said first and second springs bias said conically tapered interior side surfaces of said third and fourth cylindrical members into complementary abutment with said pair of conically tapered sections of said rear guide tray end wall.

15. The docking module of claim 11 wherein:

said first ends of said first and second cylindrical members are transversely enlarged relative to the balances of said first and second cylindrical members and have peripheral rib portions that slidingly engage said support wall.

16. The docking module of claim 11 wherein:

said docking station electrical connector has a spaced pair of forwardly projecting guide pins disposed thereon and having tapered front end portions.

17. The docking module of claim 11 wherein:

said bottom wall of said guide tray has an opening therein, and said docking module further comprises a travel plate member supported beneath said bottom wall, in a parallel relationship therewith, for motor-driven movement relative to said bottom wall toward and away from said rear end wall of said guide tray, said travel plate member having a transverse tab portion projecting upwardly through said opening in said bottom wall of said guide tray.

18. Computer apparatus comprising:

a portable computer having a rear side, a bottom side, a pair of opposite side wall portions extending forwardly from said rear side, and a first electrical connector structure carried on said rear side; and a docking station structure for removably connecting said portable computer to external peripheral devices, such as a monitor, keyboard and mouse, said docking station structure including:

a housing having an exterior opening through which said portable computer may be rearwardly inserted into the interior of said housing, a generally rectangular guide tray, disposed in the interior of said housing and extending rearwardly from said opening therein, said guide tray having an open top side, a bottom wall, a rear end wall, and a pair of opposite side walls projecting upwardly from said bottom wall and extending forwardly from said rear end wall, said guide tray being configured to receive said computer with said opposite side wall portions of said computer slidingly engaging and being guided by said pair of opposite side walls of said guide tray, a second electrical connector structure configured to telescopingly engage said first electrical connector structure, floating support means for associating said second electrical connector structure with said rear end wall of said guide tray to be telescoping engaged by said first electrical connector structure as said computer is moved, rear side first, through said guide tray, said floating support means being operative to (1) resiliently bias said second electrical connector forwardly toward an initial, ready-for-docking position, (2) permit said second electrical connector structure to be translationally deflected from said initial, ready-for-docking position in a rearward direction and in a direction parallel to said rear end wall, and (3) substantially prevent rotation of said second electrical connector structure relative to said guide tray while said second electrical connector structure is in its initial, ready-for-docking position or is being translationally deflected therefrom and a support wall disposed behind said rear end wall of said guide tray in a generally parallel, facing relationship therewith, said floating support means including:

first and second spaced apart cylindrical members disposed between said support wall and said rear end wall of said guide tray, and having first ends slidably engaging said support wall, third and fourth cylindrical members respectively and telescopingly engaged with said first and second cylindrical members for axial movement relative thereto, a base member extending between and anchored to said third and fourth cylindrical members for movement therewith, said docking station electrical connector being fixedly secured to said base member for movement therewith, and first and second springs biasing said first and second cylindrical members toward engagement with said support wall, and biasing said third and fourth cylindrical members toward engagement with said rear end wall of said guide tray.

19. The computer apparatus of claim 18 wherein:

said guide tray is formed from a precision molded plastic material, and said docking station structure further comprises a generally rectangular sheet metal support tray nestingly receiving said guide tray, said support tray having a rear end wall defining said support wall.

20. The computer apparatus of claim 18 wherein:

said first and second springs are cylindrically coiled compression springs, with said first spring being coaxially and captively retained within the telescoped first and third cylindrical members, and said second spring being coaxially and captively retained within the telescoped second and fourth cylindrical members.

21. The computer apparatus of claim 18 wherein:

said third and fourth cylindrical members have end portions facing said rear guide tray end wall and having conically tapered interior side surfaces, said rear guide tray end wall has a pair of conically tapered sections projecting toward said support wall, said conically tapered sections being complementarily configured relative to said conically tapered interior side surfaces of said third and fourth cylindrical member end portions and receivable in said end portions, and said first and second springs bias said conically tapered interior side surfaces of said third and fourth cylindrical members into complementary abutment with said pair of conically tapered sections of said rear guide tray end wall.

22. The computer apparatus of claim 18 wherein:

said first ends of said first and second cylindrical members are transversely enlarged relative to the balances of said first and second cylindrical members and have peripheral rib portions that slidingly engage said support wall.

23. The computer apparatus of claim 18 wherein:

said second electrical connector structure has a spaced pair of forwardly projecting guide pins disposed thereon and having tapered front end portions, and said first electrical connector structure has a spaced pair of guide sockets disposed therein and configured to removably receive said guide pins, said guide sockets having tapered outer end portions.

24. The computer apparatus of claim 18 wherein:

said docking station structure has a motherboard disposed in said housing, and said second electrical connector structure is operatively connected to said motherboard by a flexible ribbon cable connector.

25. The computer apparatus of claim 18 wherein:

said portable computer is a notebook computer.

* * * * *